US010838462B1

(12) United States Patent
Monaco et al.

(10) Patent No.: US 10,838,462 B1
(45) Date of Patent: Nov. 17, 2020

(54) SMART CASE FOR A PORTABLE ELECTRONIC DEVICE

(71) Applicant: Apple Inc., Cupertino, CA (US)

(72) Inventors: Devon A. Monaco, San Jose, CA (US); Stephen T. Schooley, Menlo Park, CA (US); Lian Zhang, Cupertino, CA (US); Ross D. Arriens, Mountain View, CA (US); Lucy Elizabeth Browning, San Francisco, CA (US); Richard Hung Minh Dinh, Saratoga, CA (US); Sawyer I. Cohen, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/289,610

(22) Filed: Feb. 28, 2019

Related U.S. Application Data

(60) Provisional application No. 62/728,534, filed on Sep. 7, 2018.

(51) Int. Cl.
G06F 1/16 (2006.01)
G06F 1/324 (2019.01)
G06F 1/20 (2006.01)
H04M 1/02 (2006.01)

(52) U.S. Cl.
CPC ............ G06F 1/1637 (2013.01); G06F 1/206 (2013.01); G06F 1/324 (2013.01); H04M 1/0249 (2013.01); G06F 2200/1633 (2013.01); H04M 2250/12 (2013.01)

(58) Field of Classification Search
CPC combination set(s) only.
See application file for complete search history.

(56) References Cited

U.S. PATENT DOCUMENTS

| 9,207,730 | B2 | 12/2015 | Andrews |
| 9,720,467 | B2 | 8/2017 | Jain et al. |
| 9,829,941 | B1* | 11/2017 | Saeidi ................... G06F 1/206 |
| 2011/0301778 | A1* | 12/2011 | Liang ................. G05D 23/1932 |
| | | | 700/299 |
| 2012/0254479 | A1 | 10/2012 | Matsuoka |

(Continued)

FOREIGN PATENT DOCUMENTS

CN 106774519 A 5/2017
JP 2017183924 A 10/2017

Primary Examiner — Ganiyu A Hanidu
(74) Attorney, Agent, or Firm — Dickinson Wright RLLP

(57) ABSTRACT

This application relates to adjusting an operation of a portable electronic device based on the detection of a protective case. A processor of the portable electronic device is configured to receive a signal that indicates the portable electronic device is in contact with and retained by the protective case. Responsive to receiving the signal, the processor is configured to allow the component to transition from a first operating state to a second operating state. The first operating state is associated with a first operating temperature that corresponds to a first temperature range at a surface of a housing for the portable electronic device. The second operating state is associated with a second operating temperature that corresponds to a second temperature range at the surface of the housing. The second operating temperature is greater than the first operating temperature.

15 Claims, 9 Drawing Sheets

(56) References Cited

U.S. PATENT DOCUMENTS

| | | | |
|---|---|---|---|
| 2013/0082532 A1* | 4/2013 | Rich | H02J 7/32 |
| | | | 307/72 |
| 2014/0236380 A1* | 8/2014 | Alton | G06F 1/206 |
| | | | 700/299 |
| 2014/0362518 A1* | 12/2014 | Huang | G06F 1/206 |
| | | | 361/679.46 |
| 2015/0043156 A1* | 2/2015 | Jain | H04M 1/72575 |
| | | | 361/679.46 |
| 2015/0057830 A1* | 2/2015 | Slaby | G05D 23/1917 |
| | | | 700/300 |
| 2015/0201723 A1* | 7/2015 | Rayner | F16M 13/04 |
| | | | 224/191 |
| 2017/0031398 A1 | 2/2017 | Myers et al. | |

\* cited by examiner

SMART CASE FOR A PORTABLE ELECTRONIC DEVICE

CROSS-REFERENCE TO RELATED APPLICATIONS

The present application claims the benefit of U.S. Provisional Application No. 62/728,534, entitled "SMART CASE FOR A PORTABLE ELECTRONIC DEVICE," filed Sep. 7, 2018, the content of which is incorporated herein by reference in its entirety for all purposes.

FIELD

The described embodiments relate generally to portable electronic device accessories. More particularly, the present embodiments relate to a case accessory that is capable of being detected by a portable electronic device.

BACKGROUND

People are using portable electronic devices such as mobile phones or tablet computers more frequently as the functionality of such devices improves. As technology advances, the devices have become much more powerful, and more and more components are being designed to fit in a small form factor. For example, mobile phones today include processors, solid state memory devices, multiple antennas and radios, speakers and microphones, batteries, multiple cameras, global positioning system (GPS) sensors, gyroscopes, accelerometers, thermistors, pressure transducers, full-surface displays with touch-sensitive capability, wireless charging, and so forth. The variety of components now included in these devices increase the functionality that can be exploited by developers in new and useful ways.

These electronic components generate heat during operation. A majority of the heat is dissipated via convection and/or conduction. Air circulating around the surfaces of the device can carry away heat via convection. Similarly, objects in contact with the device can carry away heat via conduction. However, as the power of the device increases and the design of the device changes, sometimes the amount of heat being generated cannot be adequately dissipated. In such cases, the temperature of the device will increase, which could lead to failures of the components themselves due to, e.g., melting solder connections or faults in metal structures inside an integrated circuit. Even if the temperature does not increase to the point of causing failures, the device itself could be uncomfortable to handle. For example, the surfaces of the device can feel warm to the touch, which can lead to an unpleasant user experience. Consequently, new techniques are desired for dissipating heat from the device or reducing an amount of heat generated by the device.

SUMMARY

This paper describes various embodiments that relate to a smart case for a portable electronic device. A case, such as a silicone, rubber, plastic, metal, or composite structure that surrounds one or more sides of the portable electronic device, can include a means for detection by the portable electronic device when the case is attached to the portable electronic device. The portable electronic device can be configured to detect the presence of the case and adjust operating parameters for the portable electronic device in response to detecting the presence of the case. The operating parameters include a thermal threshold associated with a temperature sensor included in the portable electronic device.

In some embodiments, a processor of the portable electronic device is configured to receive a signal that indicates the portable electronic device is in contact with and retained by the protective case. Responsive to receiving the signal, the processor is configured to allow the component to transition from a first operating state to a second operating state. The first operating state is associated with a first operating temperature that corresponds to a first temperature range at a surface of a housing for the portable electronic device. The second operating state is associated with a second operating temperature that corresponds to a second temperature range at the surface of the housing. The second operating temperature is greater than the first operating temperature.

In some embodiments, the sensor is a thermistor located proximate a side wall of the housing of the portable electronic device. The thermistor generates a signal that is utilized to determine an operating temperature of a particular component proximate the thermistor. In other embodiments, the sensor is embedded within an integrated circuit. The processor can be implemented within an integrated circuit, and the sensor generates a signal that is utilized by the processor to determine an operating temperature of the integrated circuit. In some embodiments, the processor is configured to correlate the operating temperature of the integrated circuit to an estimated temperature at the surface of the housing, which can be compared with a threshold value to adjust the operation of the portable electronic device based on the result of the comparison.

In some embodiments, the processor is configured to enter a low power mode of operation when an operating temperature of the component exceeds a thermal threshold. In the second operating state, the thermal threshold is increased in response to the signal from a maximum temperature in the first temperature range to a maximum temperature in the second temperature range.

In some embodiments, the signal is generated by a magnetic sensor configured to detect the magnitude or orientation of a magnetic field generated by a magnetic element embedded in the protective case. In other embodiments, the signal is received by a receiver of the portable electronic device configured to operate according to a Near Field Communication protocol. The receiver can be coupled to an antenna for receiving radio frequency signals. In some embodiments, the protective case includes a passive radio frequency identification (RFID) tag that, when excited by a radio frequency signal generated by the portable electronic device, emits the signal indicating that the protective case is in contact with and retained by the portable electronic device.

In some embodiments, a case is described for a portable electronic device that includes a housing and a display assembly. A top surface of the display assembly is overlaid by a first glass substrate, and a bottom surface of the housing is overlaid by a second glass substrate. The case includes a flexible substrate and a thermal insert. The flexible substrate has a shape and size suitable to retain the portable electronic device. The thermal insert is embedded within the flexible substrate, the thermal insert thermally coupled to an exposed thermal structure within one or more side walls of the flexible substrate. The exposed thermal structure is in thermal contact with the housing on one or more sides of the portable electronic device.

In some embodiments, the thermal insert includes a graphite sheet. The exposed thermal structure can include a metal band laminated to an inner layer of the one or more sidewalls of the flexible substrate. In some embodiments, the case includes a magnetic element embedded within the flexible substrate at a location corresponding to a sensor included in the portable electronic device. In other embodiments, the case includes a radio frequency identification tag configured to provide a radio frequency signal to the portable electronic device that indicates the portable electronic device is retained within the case.

In some embodiments, a computing device is described that is operable in a first operating state. The computing device includes a housing having a cavity formed therein. The computing device also includes a component that generates heat, disposed within the cavity. The computing device further includes a display assembly attached to the housing, an insulating layer laminated to a bottom surface of the housing, and a temperature sensor configured to measure an operating temperature that corresponds with a surface of the housing. The display assembly can be overlaid by a glass substrate. The processor of the computing device is configured to execute instructions that cause the processor to: determine whether the computing device is retained within an accessory that is in thermal contact with the surface of the housing; increase a thermal threshold associated with the temperature sensor above a baseline threshold responsive to determining that the computing device is retained within the accessory; determine that the operating temperature is greater than the thermal threshold; and cause the computing device to operate in a low power mode of operation.

In some embodiments, the component includes a system-on-chip (SoC) including at least one central processing unit (CPU) core and at least one graphics processing unit (GPU) core in a package. The CPU core of the SoC can be the processor executing the instructions. The computing device further includes an image sensor located proximate the SoC within the cavity, and the temperature sensor is a thermistor located proximate the SoC and the image sensor near a wall of the housing.

In some embodiments, the computing device further includes at least one magnetic sensor configured to detect a magnitude and orientation of a magnetic field corresponding to a magnetic element embedded within the accessory. In some embodiments, the computing device further includes a radio frequency transceiver coupled to an antenna, the radio frequency transceiver configured to receive a radio frequency signal from a radio frequency identification tag included in the accessory. The radio frequency signal indicates to the computing device that the computing device is in thermal contact with and retained by the accessory.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
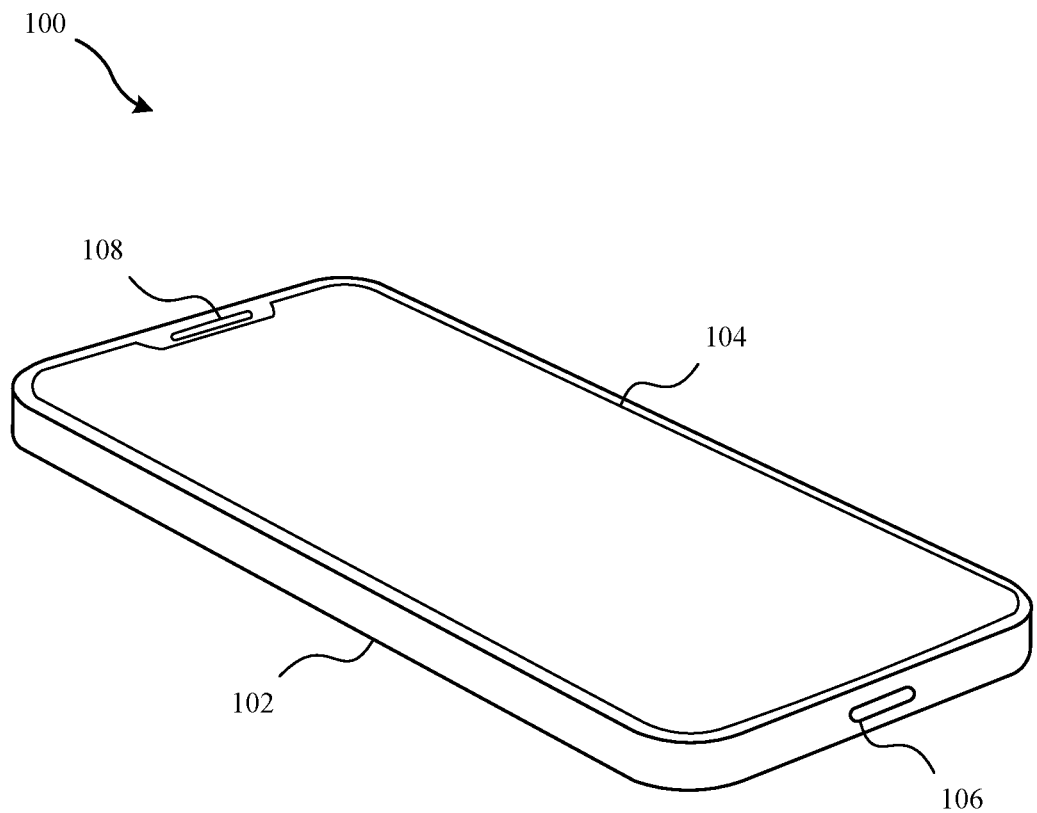
FIG. 1 illustrates a portable electronic device, in accordance with some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Electronic devices generate heat during operation, and the heat is dissipated via conduction, convection, and/or radiation. The electronic devices can get hot, which may make portable electronic devices difficult to hold or touch without getting burned or feeling uncomfortable. Thus, thermal characteristics of the device are considered in the design of the device. In some embodiments, an accessory for a device can be designed to aid in the heat dissipation of the device. For example, the accessory attached to a device can include a heat sink or other thermal structure such as a heat spreader that provides an additional path or an alternative path for heat generated by the device. In some cases, the accessory can increase a rate of heat dissipation of the device. In such cases where an accessory can improve the thermal characteristics of a device, it can be beneficial for the device to be configured to detect the presence of the accessory such that the operating state or a parameter associated with the operation of the device can be adjusted to improve the operating characteristics of the device.

In some embodiments, a protective case is provided for a portable electronic device. The protective case includes an element that is detectable by a sensor included in the portable electronic device. Detection of the element by the sensor indicates that the portable electronic device is in contact with and retained by the protective case. In some embodiments, the sensor can be a magnetic sensor configured to detect a magnetic element embedded within the protective case. In other embodiments, multiple magnetic elements are embedded within the protective case at multiple locations corresponding to multiple sensors in the portable electronic device. Each sensor can be configured to detect a magnitude and/or orientation of a magnetic field proximate the sensor. A processor can sample the signals from the one or more sensors to determine whether the portable electronic device is in contact with and retained by the protective case based on the signal(s).

In some embodiments, the protective case includes an element that generates a radio frequency signal that is received by the portable electronic device. The radio frequency signal can be received by the portable electronic device and analyzed to detect the presence of the protective case. In some embodiments, the protective case can include a passive radio frequency identification tag that, when excited by an excitation signal, generates a radio frequency signal that can be received by an antenna in the portable electronic device. The processor can analyze the radio frequency signal to determine whether the portable electronic device is in contact with and retained by the protective case. For example, a range to the protective case can be estimated by analyzing a time delay between the excitation signal and the response signal. The portable electronic device is in contact with and retained by the protective case when the estimated range is within a threshold distance (e.g., within a few inches) of the portable electronic device. Alternatively, the power of the excitation signal can be limited such that receiving a response signal at the portable electronic device is a positive indication that the protective case is within the threshold distance.

The portable electronic device is configured as operable in a number of different operating states. A first operating state is enabled when the portable electronic device is not retained within a protective case, which can be referred to as a normal mode of operation. A number of parameters are associated with the normal operating state. A second operating state is enabled when the portable electronic device is in contact with and retained by the protective case. At least one parameter can be adjusted in the second operating state to improve operation of the portable electronic device responsive to detection of the protective case. For example, a processor speed (e.g., a system clock frequency) can be increased in the second operating state due to the improved thermal characteristics of the portable electronic device provided by the protective case.

A third operating state can be enabled when a measured temperature within the portable electronic device exceeds a temperature threshold value, which can be referred to as a low power mode of operation. The third operating state can be enabled when a measured temperature indicates that the user could become uncomfortable when holding the portable electronic device due to excessive heat on one or more surfaces of the portable electronic device. The temperature threshold value can take a first value in the first operating state and a second value, greater than the first value, in the second operating state. In other words, the temperature threshold value is higher when the portable electronic device is utilized within a protective case than when the portable electronic device is not utilized with the protective case. Consequently, entry into the low power mode of operation can be delayed until the temperature of the device is raised above the higher temperature threshold value, which allows for extended operation in the normal operating mode.

These and other embodiments are discussed below with reference to FIGS. 1-9; however, those skilled in the art will readily appreciate that the detailed description given herein with respect to these figures is for explanatory purposes only and should not be construed as limiting.

FIG. 1 illustrates a portable electronic device 100, in accordance with some embodiments. The portable electronic device 100 includes a housing 102, a display assembly 104, a connector port 106, and a speaker 108. The housing 102 can include a substrate having a cavity formed therein. The substrate can be metal, plastic, ceramic, or other suitable materials for forming structural components as well as any combination thereof. The housing 102 can be machined, forged, molded, extruded, or otherwise formed by a combination of techniques. In some embodiments, the housing 102 is machined from an aluminum billet and includes a number of structures formed therein. A main structure is an opening in a surface of the aluminum billet that leads to a cavity. Operational components of the portable electronic device 100 can be disposed within the cavity.

In some embodiments, the connector port 106 is an opening in a surface of the housing 102 that accepts a male connector attached to a cable having a number of conductors. A female connector is disposed in the connector port, enabling power and/or data signals to be provided to operational components disposed within the housing 102.

In some embodiments, the display assembly 104 includes a display unit such as a liquid crystal display (LCD) layer disposed over a backlight. Alternatively, the display unit can be an organic light emitting diode (OLED) display that does not include a backlight. The display assembly 104 can also include one or more touch sensors for detecting touch input on a surface of the display assembly 104. In some embodiments, the display assembly 104 is overlaid by a glass substrate that can be adhered to a front surface of the display assembly 104. The glass substrate can include an opening located proximate the speaker 108.

The portable electronic device 100 can include a speaker 108 located near a top edge of the housing 102. The speaker 108 is capable of reproducing an audio signal such that a user can listen to a voice call by placing the speaker proximate the user's ear. Although not shown explicitly, the speaker 108 can be included in an assembly that also includes a receiver (e.g., an antenna and signal circuitry for receiving radio frequency wireless signals), a front-facing camera (e.g., a lens assembly disposed over an image sensor), a depth sensor, a microphone, and/or various additional components included proximate the top edge of the housing 102.

The portable electronic device 100 can include additional interface elements (not explicitly shown), such as buttons, disposed within openings in a surface of the housing 102. For example, buttons can be pressed by a user to increase or decrease a volume of the speaker 108. As another example, a button or switch can also be included on the surface of the housing 102 to toggle a muted mode of operation (e.g., to disable one or more of a speaker or microphone, disable audio alerts such as a ring tone, etc.). A button or switch can also be included on the same or a different surface of the housing 102 to toggle a power supplied to the components of the device.

It will be appreciated that the portable electronic device 100 can take the form of a mobile phone, which can alternately be referred to as a smart phone, a cell phone, a cellular device, user equipment (UE), or the like. However, nothing in this detailed description should be construed as limiting the techniques described herein as being applicable only to a mobile phone. In other embodiments, the portable electronic device can be a tablet computer, a portable gaming device, a digital camera, a laptop computer, or the like.

Figure 2:
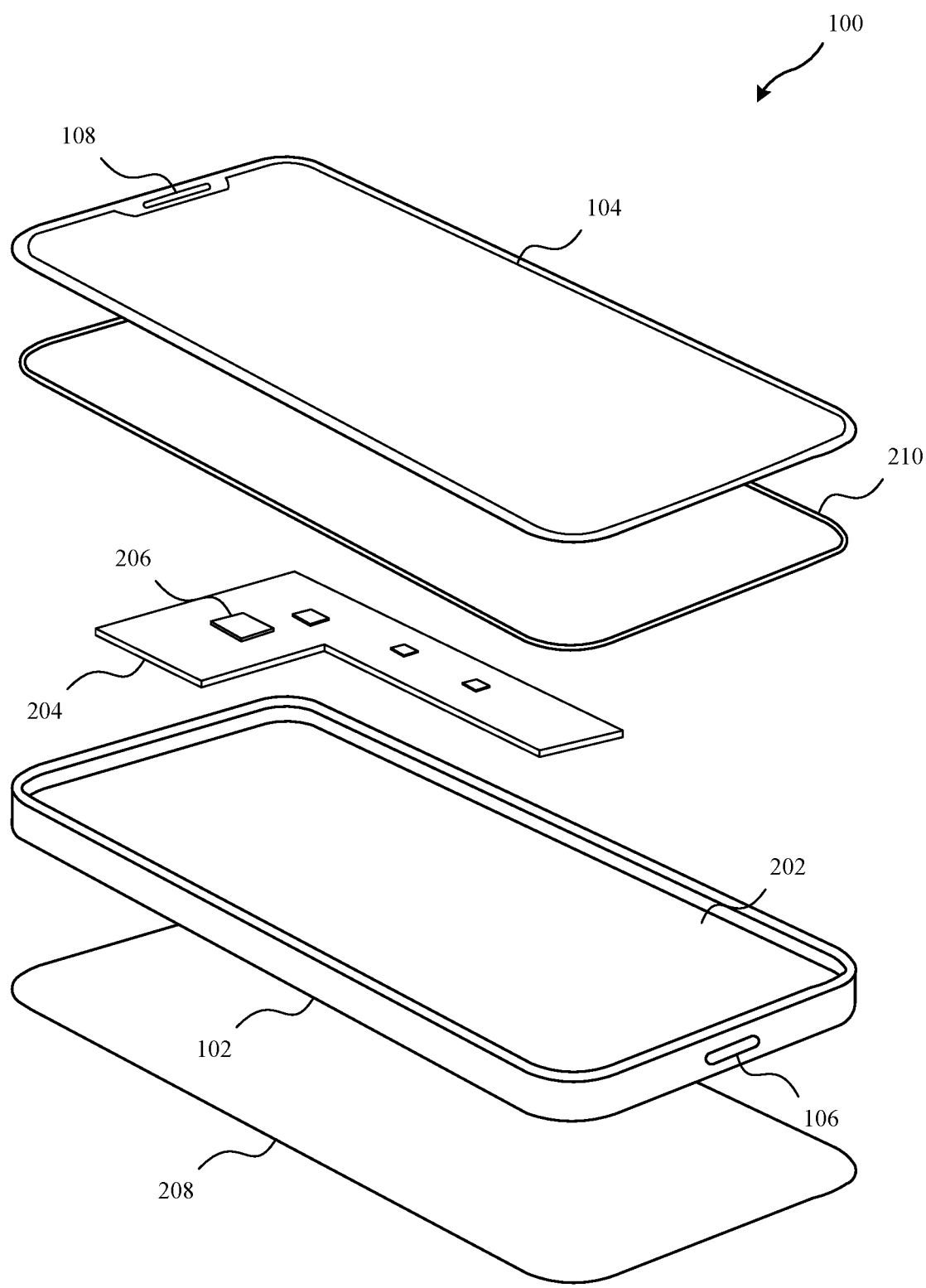
FIG. 2 is an exploded view of various components of the portable electronic device of FIG. 1, in accordance with some embodiments.

FIG. 2 is an exploded view of various components of the portable electronic device 100 of FIG. 1, in accordance with some embodiments. The exploded view depicts operational components 206 disposed on a printed circuit board 204. The printed circuit board 204 is enclosed within a cavity 202 formed in the housing 102. The cavity 202 is sealed using an adhesive 210 that surrounds a perimeter of an edge of the cavity 202. The adhesive 210 forms a bond between one or more surfaces of the housing 102 and corresponding surface (s) of the display assembly 104.

The operational components 206 can include various integrated circuit packages as well as electrical components soldered to the printed circuit board 204. In some embodiments, the operational components 206 can include a processor, memory, microelectromechanical systems (MEMS) devices, a system-on-chip (SoC), radio frequency transceivers, antennas, capacitors, resistors, inductors, and the like. Although not shown explicitly, the portable electronic device 100 can include two or more printed circuit boards connected by flexible connectors, each printed circuit board including a different subset of the operational components 206. The portable electronic device 100 can also include an energy storage device, such as a lithium-ion battery, as well as additional components such as haptic feedback systems.

In some embodiments, the portable electronic device 100 includes an insulating layer 208 bonded to a rear surface of the portable electronic device 100. The insulating layer 208 has a lower thermal conductivity characteristic compared to a thermal conductivity characteristic for a material of the housing 102. For example, the insulating layer 208 can comprise a glass substrate, which has a lower thermal conductivity (e.g., ~1 W/(m K)) than an aluminum housing (e.g., ~200 W/(m K)).

It will be appreciated that the operational components 206 can generate heat during operation. For example, a processor generates heat via electricity passing through the transistors of the integrated circuit; an image sensor generates heat during an operation for sampling pixel sites on the image sensor; and so forth. This heat is dissipated via conduction, convection, and/or radiation, as is well-known in the art.

In embodiments where the portable electronic device 100 includes a glass substrate overlaid on top of the display assembly 104 and/or an insulating layer 208 bonded to a rear surface of the housing 102, the steady state temperature at an external surface of the portable electronic device 100 is greatest at locations on the exposed surfaces of the housing 102. As depicted in FIG. 2, the location of the greatest steady state temperature will be located around a perimeter of the housing 102 on the top, bottom, left, or right surfaces of the portable electronic device 100. It will be appreciated that the peak temperature at a location around the perimeter will be likely proximate a location of the largest heat generating components within the cavity 202 of the portable electronic device 100. For example, the peak temperature at an external surface of the portable electronic device 100 can be located at a point on the housing 102 proximate an SoC on a main printed circuit board within the cavity 202. In some embodiments, the peak temperature at an external surface of the portable electronic device 100 can be located at a point on the housing 102 proximate the SoC and an image sensor that are located in the top-right quadrant (when looking at the front surface of the display assembly 104) of the portable electronic device 100. It will be appreciated that the peak temperature can be located at any point around the housing 102 based on the location of operational components disposed within the cavity 202 as well as the operation of such components. For example, the image sensor may not generate heat when disabled, which will cause the location of the peak temperature to shift towards other heat generating components.

Figure 3:
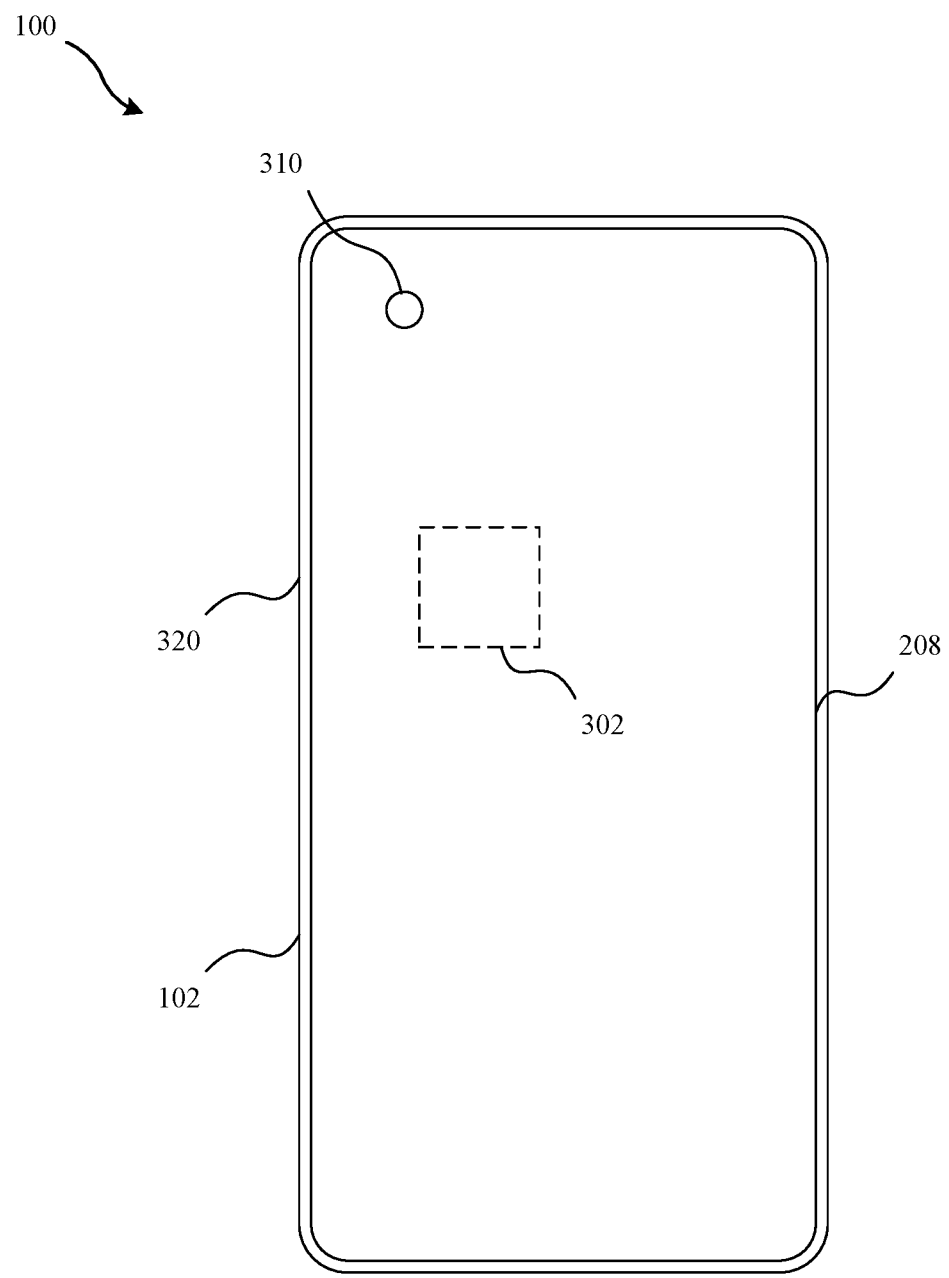
FIG. 3 is a rear view of the portable electronic device, in accordance with some embodiments.

FIG. 3 is a rear view of the portable electronic device 100, in accordance with some embodiments. The rear surface of the portable electronic device includes a camera assembly 310. The camera assembly 310 includes a lens assembly with one or more optical lenses disposed above corresponding image sensors. The camera assembly 310 can also include a flash device that is capable of emitting light to illuminate objects in close proximity to the portable electronic device 100. FIG. 3 clearly shows the camera assembly 310 in a top-left quadrant (when looking at insulating layer 208 on the rear surface of the housing 102) of the portable electronic device 100. A location of the SoC relative to the camera assembly 310 is shown via dashed box 302, which represents the SoC attached to a main printed circuit board disposed within the cavity 202 of the portable electronic device 100.

It will be appreciated that a peak temperature on the external surface of the portable electronic device 100 can be found at location 320, which is located proximate the SoC and the image sensor(s) associated with the camera assembly 310. These components can be the largest sources of heat generation in the portable electronic device 100. However, in other embodiments, the peak temperature on the external surface of the portable electronic device 100 can be found at a different location on the perimeter of the housing 102, which is ultimately dependent on the structure and location of operational components included in the portable electronic device as well as the characteristics of materials utilized within those operational components and other structural components in the portable electronic device.

Figure 4:
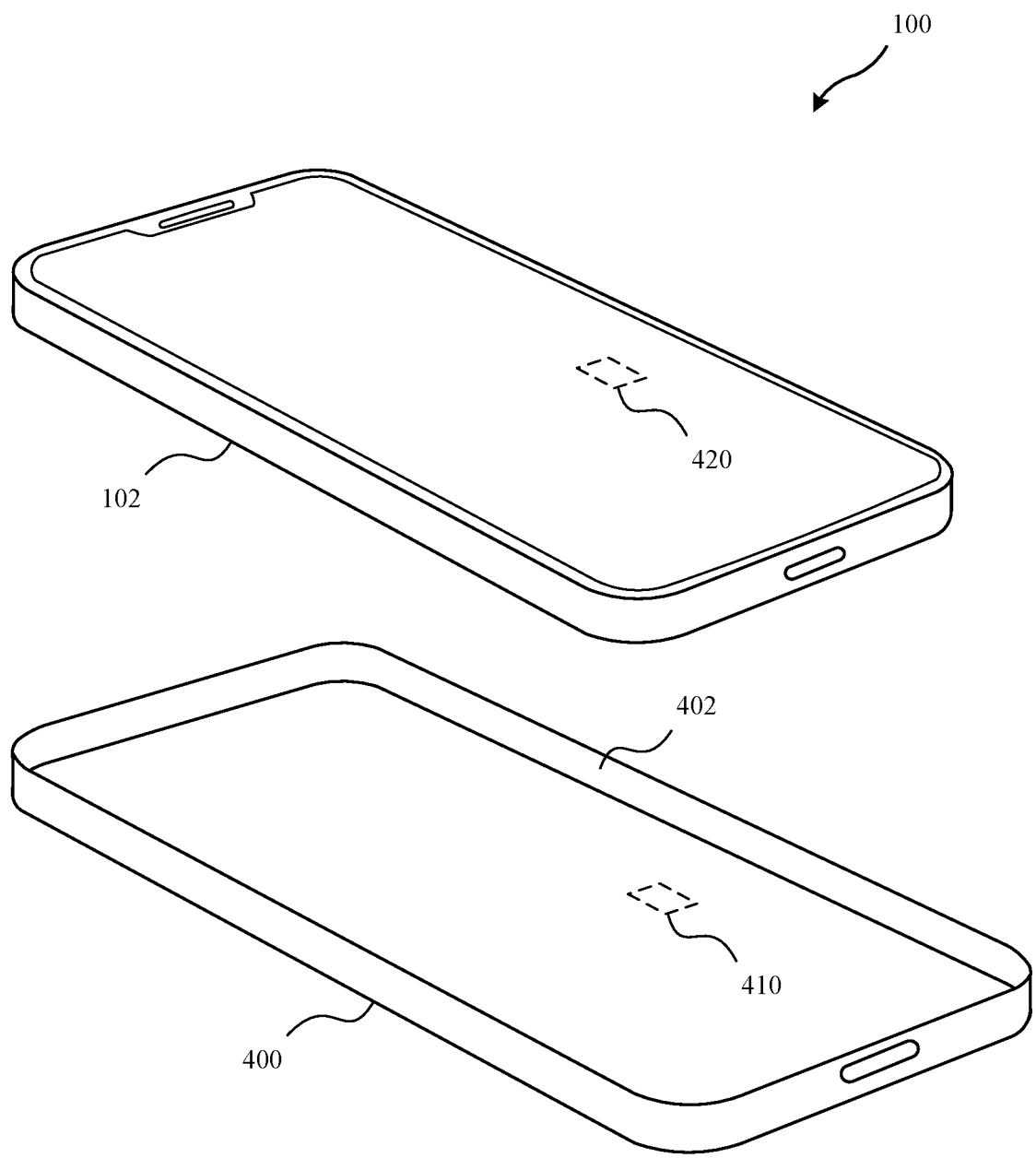
FIG. 4 illustrates a protective case for the portable electronic device, in accordance with some embodiments.

FIG. 4 illustrates a protective case 400 for the portable electronic device 100, in accordance with some embodiments. The protective case 400 can also be referred to as a case, cover, or accessory. In some embodiments, the protective case 400 is made of a flexible substrate such as silicone or similar elastomers. The protective case 400 can be molded into a shape that conforms with a shape of the portable electronic device 100. The protective case 400 can then be deformed elastically to place the protective case 400 on the portable electronic device 100, thereby retaining the portable electronic device 100 within the protective case 400.

As utilized with the portable electronic device 100, the protective case 400 fits over and is in contact with one or more external surfaces of the portable electronic device 100. In some embodiments, the protective case 400 is in thermal contact with at least one surface of the housing 102 around a perimeter of the portable electronic device 100. For example, the protective case 400 includes sidewalls 402 that are in thermal contact with at least one of the top, bottom, left, and right surfaces of the housing 102. The sidewalls 402 of the protective case 400 can include an exposed material that is different than the flexible substrate, the exposed material having better thermal conductivity characteristics than the flexible substrate. For example, a metallic material can be exposed on the interior surface of the sidewalls 402 and embedded within the flexible substrate. This material can promote the conduction of heat away from the surface of the housing 102 and into the protective case 400.

In some embodiments, the flexible substrate is a good thermal insulator. Placing the protective case 400 between a user's hand and the surface of the housing 102, can alter the perception to the user of an operating temperature of the portable electronic device 100 due to the insulating nature of the protective case 400. Furthermore, the design and materials of the protective case 400 can actually improve the thermal characteristics of the combined system (e.g., the portable electronic device 100 and the protective case 400) by increasing a surface area of a surface for dissipating heat compared to an exposed surface of the housing 102.

In some embodiments, the protective case 400 can be referred to as a smart cover. In such embodiments, the protective case 400 includes an element for conveying information to the portable electronic device 100 about a state of the protective case 400. The protective case 400 can include an element 410 embedded within the flexible substrate that is detectable by the portable electronic device 100. In some embodiments, the element 410 is a permanent magnet that generates a magnetic field proximate the protective case 400. In such embodiments, the permanent magnet is located at a position in the protective case 400 that corresponds with a sensor 420 included in the portable electronic device 100. The sensor 420 can be a Hall Effect sensor or some other type of magnetometer, microelectromechanical system (MEMS) device, or any other type of sensor capable of detecting or measuring a magnitude and/or an orientation of a magnetic field.

The sensor 420 can detect the magnetic field from the element 410 when the portable electronic device 100 is brought within a threshold distance of the protective case 400. In some embodiments, a strength of the magnetic field is tailored such that the sensor 420 is triggered only when the protective case 400 is very close to the portable electronic device 100, such as close enough to indicate that the portable electronic device 100 is in contact with and retained within the protective case 400. For example, a permanent magnet of a particular material that is fully saturated to generate a magnetic field having a particular orientation relative to the protective case 400 can be included within the protective case 400 such that the magnitude of the magnetic field generated by the permanent magnet at a location corresponding to the sensor 420, when the portable electronic device 100 is retained within the protective case 400, is above a threshold value as measured by the sensor 420. The measurement of a magnetic field above the threshold value can trigger detection, by a processor of the portable electronic device 100, that the portable electronic device 100 is retained within the protective case 400.

In some cases, the sensor 420 detects an orientation of the magnetic field relative to an orientation of the portable electronic device 100. For example, the orientation of a magnetic dipole of a permanent magnet embedded within the flexible substrate can be configured to be substantially normal to a rear surface of the protective case 400, which is also in a direction generally from the element 410 directed toward the sensor 420 when the portable electronic device 100 is retained within the protective case 400. The orientation can be either a North pole proximate the sensor 420 or a South pole proximate the sensor 420. The orientation of the magnetic dipole of the element 410 can be reversed in different protective cases to differentiate between different case types. For example, a case that includes a heat spreader for improving the thermal characteristics of the portable electronic device 100 can include an element 410 having a North pole oriented towards the sensor 420 and a case that does not include a heat spreader can include an element 410 having a South pole oriented towards the sensor 420. The orientation can be interpreted by the processor to adjust the operation of the portable electronic device based on the type of protective case 400. For example, an operating parameter can take a first value when no case is detected, the parameter can take a second value when a first type of case is detected, and the parameter can take a third value when a second type of case is detected.

It will be appreciated that the element 410 is not limited to a component capable of generating a magnetic field. In other embodiments, the element 410 can generate a radio frequency signal to communicate with the portable electronic device 100 via a Near Field Communication (NFC) protocol. In some embodiments, the element 410 is a radio frequency identification (RFID) tag. The RFID tag can be a passive device that, when excited by a radio frequency signal generated by the portable electronic device 100, emits a signal indicating that the protective case 400 is in contact with and retained by the portable electronic device 100. In such embodiments, the sensor 420 can comprise an antenna and signal processing circuitry configured to transmit and/or receive radio frequency signals according to the NFC protocol.

In some embodiments, the range from the element 410 to the sensor 420 can be detected in order to determine whether the portable electronic device 100 is retained within the protective case 400. For example, the power of the excitation signal can be limited such that the excitation signal will only be sufficient to trigger a response signal, capable of being received by the sensor 420, when the element 410 is within a threshold distance of the sensor 420. As another example, a delay time between sending the excitation signal and receiving a response signal can be measured to estimate a round-trip distance between the sensor 420 and the element 410. As long as the measured delay time is below a threshold delay time, then the distance between the element 410 and the sensor 420 can be inferred to be within some range that indicates the portable electronic device 100 is retained within the protective case 400.

In other embodiments, the element 410 and the sensor 420 can take other forms as well. For example, the element 410 can include contacts that connect a circuit coupled to the sensor 420 when the inner, rear surface of the protective case 400 is placed in contact with a rear surface of the portable electronic device 100. The sensor 420 can then detect a current that passes through the circuit to determine whether the portable electronic device 100 is retained within the protective case 400. As another embodiment, the sensor 420 can comprise a capacitance sensor that detects a changed capacitance based on the presence of a conductive material (e.g., a metal foil) embedded in the protective case 400, using the insulating layer 208 of the portable electronic device 100 as a dielectric to create the implicit capacitor. The capacitance sensor can detect a uniformity in the capacitive coupling between the protective case 400 and the rear surface of the portable electronic device 100 to distinguish between other objects, such as a human hand, and the protective case 400. In some cases, the shape of the conductive material can be designed to produce a distinct signal within the capacitance sensor that can be distinguished from, e.g., a signal generated in response to placing the portable electronic device 100 on a flat conductive surface such as a metal table. In a similar fashion, different shapes of the conductive material can be used to distinguish between different case types.

In some embodiments, the sensor 420 can be a strain gauge that measures a force imparted on the housing 102 by the protective case 400. In such cases, the element 410 can be omitted from the protective case 400. However, in yet other embodiments, the strain gauge sensor 420 works in conjunction with an element 410 such as the passive RFID tag. The RFID tag can provide information related to an identification of capabilities of the protective case 400 to the portable electronic device 100 through an antenna and signal processing circuitry while the strain gauge is utilized to confirm that the protective case 400 is in contact with the housing 102. Of course, the strain gauge can be replaced in lieu of an optical sensor, capacitance sensor, or some other type of sensor utilized to confirm the contact of the protective case 400 with a surface of the housing 102.

In some embodiments, the element 410 can include an integrated circuit that implements a controller. The controller can be connected to a power source, either embedded within the protective case 400 or derived from the portable electronic device 100 when the portable electronic device 100 is retained within the protective case 400. For example, the protective case 400 can also include a connector that is inserted into the connector port 106 of the portable electronic device 100 to receive power when the portable electronic device 100 is inserted into the protective case 400. The controller can then communicate directly with the portable electronic device 100 via a wireless (e.g., via an antenna and transceiver) or a wired (e.g., via the connector) communication channel. The communication channel enables the protective case 400 to be discovered by the portable electronic device 100 or otherwise signal the portable electronic device 100 that the portable electronic device 100 is retained within the protective case 400.

The capability of the portable electronic device 100 to be able to detect when the protective case 400 is placed over and in contact with the housing 102 enables an operating state of the portable electronic device 100 to be adapted responsive to the detection of the protective case 400. For example, the portable electronic device 100 can be configured to operate in a first operating state when the portable electronic device 100 does not detect the protective case 400 and can be configured to operate in a second operating state when the portable electronic device 100 detects the protective case 400. In some embodiments, the utilization of the protective case 400 can improve the operating characteristics of the portable electronic device 100.

In some embodiments, a temperature threshold parameter of the portable electronic device 100 is related to the comfort of a user when holding the portable electronic device 100. For example, the temperature at an external surface of the portable electronic device 100 can increase to a point that the device, although not hot enough to burn a user's hand or cause failures with electronic components disposed within the device, is warm (e.g., 110 degrees Fahrenheit). When a temperature of the surface rises above this threshold temperature, then the portable electronic device 100 can be caused to operate in a low-power mode in order to try to cool the device down. However, this temperature threshold can be increased when the protective case 400 covers the aluminum housing 102 because the flexible substrate provides a layer of insulation between a user's skin and the housing 102, which alters a perception of how hot the portable electronic device 100 is to the user because the surface of the protective case 400 can be cooler than the surface of the housing 102. By increasing the temperature threshold a few degrees, the time that the portable electronic device 100 can be operated in the normal mode of operation instead of the low power mode of operation is increased. In some embodiments, operating parameters can actually be increased to improve operation of the device, such as by increasing an operating frequency of a system clock, because the amount of heat that can be dissipated successfully is increased with the protective case 400 in place.

Figure 5:
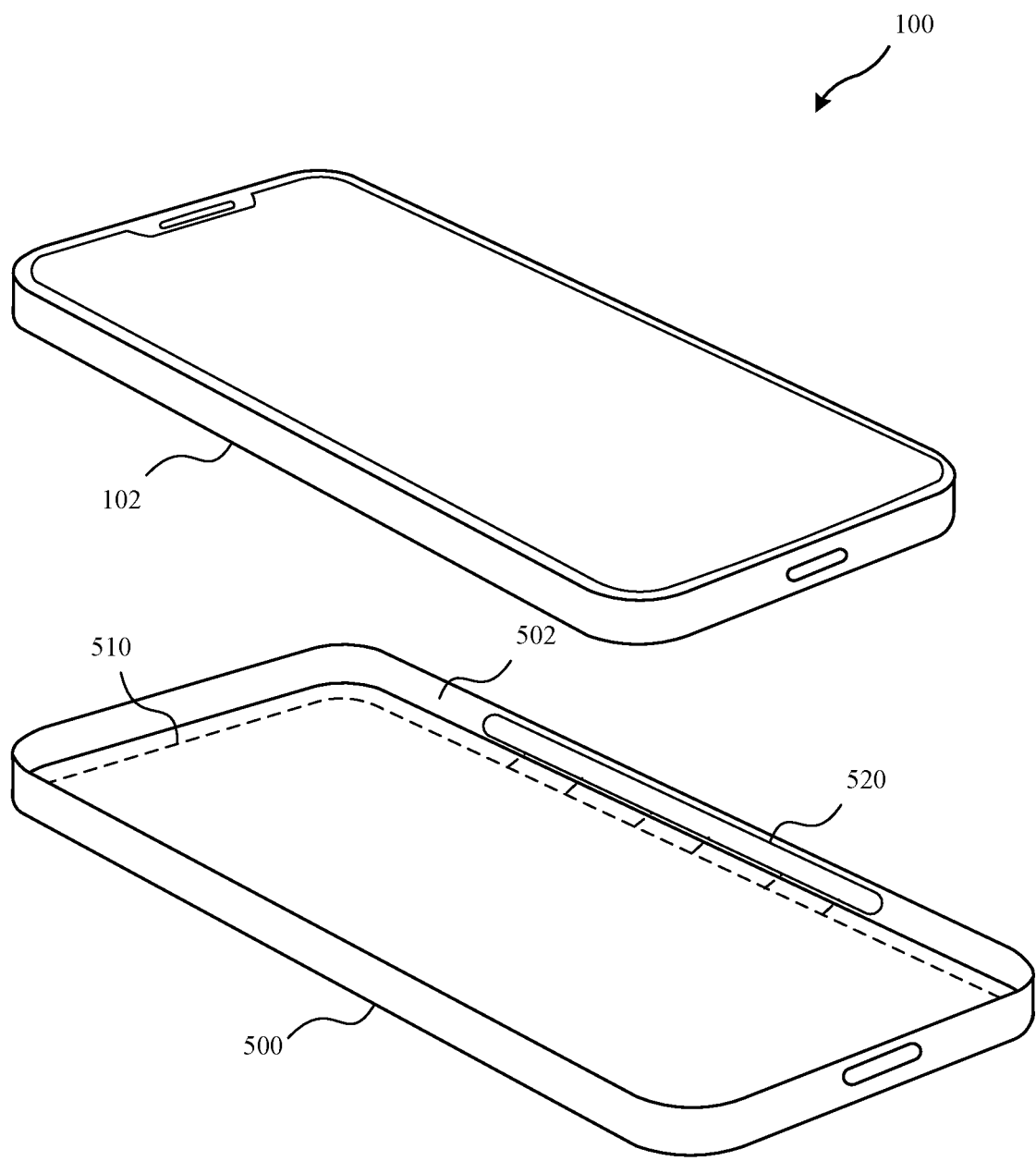
FIG. 5 illustrates a protective case for the portable electronic device, in accordance with some embodiments.

FIG. 5 illustrates a protective case 500 for the portable electronic device 100, in accordance with some embodiments. The protective case 500 can include a thermal insert 510 that is capable of acting as a heat sink and/or a heat spreader as well as a thermally conductive structure 520 in contact with one or more surfaces of the housing. The thermally conductive structure 520 can include exposed material on the interior surface of the sidewalls 502 that is thermally coupled with the thermal insert 510 to conduct heat away from the housing 102 of the portable electronic device 100 and toward the thermal insert 510. In some embodiments, the exposed thermal structure 520 comprises a metal band laminated to an inner layer of the one or more side walls of the flexible substrate and connected to the thermal insert 510 at one or more points via runners or other mechanical structures.

In some embodiments, the thermal insert 510 is a graphite sheet embedded within the flexible substrate in the rear surface of the protective case 500. The graphite sheet operates to spread the heat from the perimeter of the portable electronic device 100 along the edges of the housing 102 to a larger surface proximate the rear face of the housing 102. In some embodiments, the graphite sheet extends across substantially all of the rear surface of the protective case 500. In other embodiments, the graphite sheet merely extends across a portion of the rear surface of the protective case 500. For example, the graphite sheet could be positioned near the bottom edge of the portable electronic device 100 and operate to direct heat away from the top portion of the portable electronic device 100. It will be appreciated that, in other embodiments, the thermal insert 510 can be a material other than graphite, such as aluminum or copper, and that the thermal conductivity of the thermal insert 510 can be greater than the thermal conductivity of the flexible substrate.

The thermal insert 510 helps improve the thermal characteristics of the portable electronic device 100 by aiding to move heat around the glass substrate overlaid on top of the display assembly 104 and the insulating layer 208 bonded to the rear surface of the housing 102. It will be appreciated that the protective case 500 can also include the element 410 that can be detected by the sensor 420, enabling the portable electronic device 100 to be adapted responsive to detection of the protective case 500. The element 410 can also encode a case type within a signal provided to the sensor 420.

In some embodiments, the protective case 500 can include two or more thermal inserts 510. For example, a first thermal insert can be embedded within the flexible substrate proximate a top edge of the protective case 500 and a second thermal insert can be embedded within the flexible substrate proximate a bottom edge of the protective case 500. In some embodiments, the shape of the thermal insert is designed based on a location of the heat generating sources located in the portable electronic device 100. For example, the thermal insert can be shaped to avoid transferring heat proximate the SoC of an image sensor on a rear surface of the portable electronic device 100.

Figure 6:
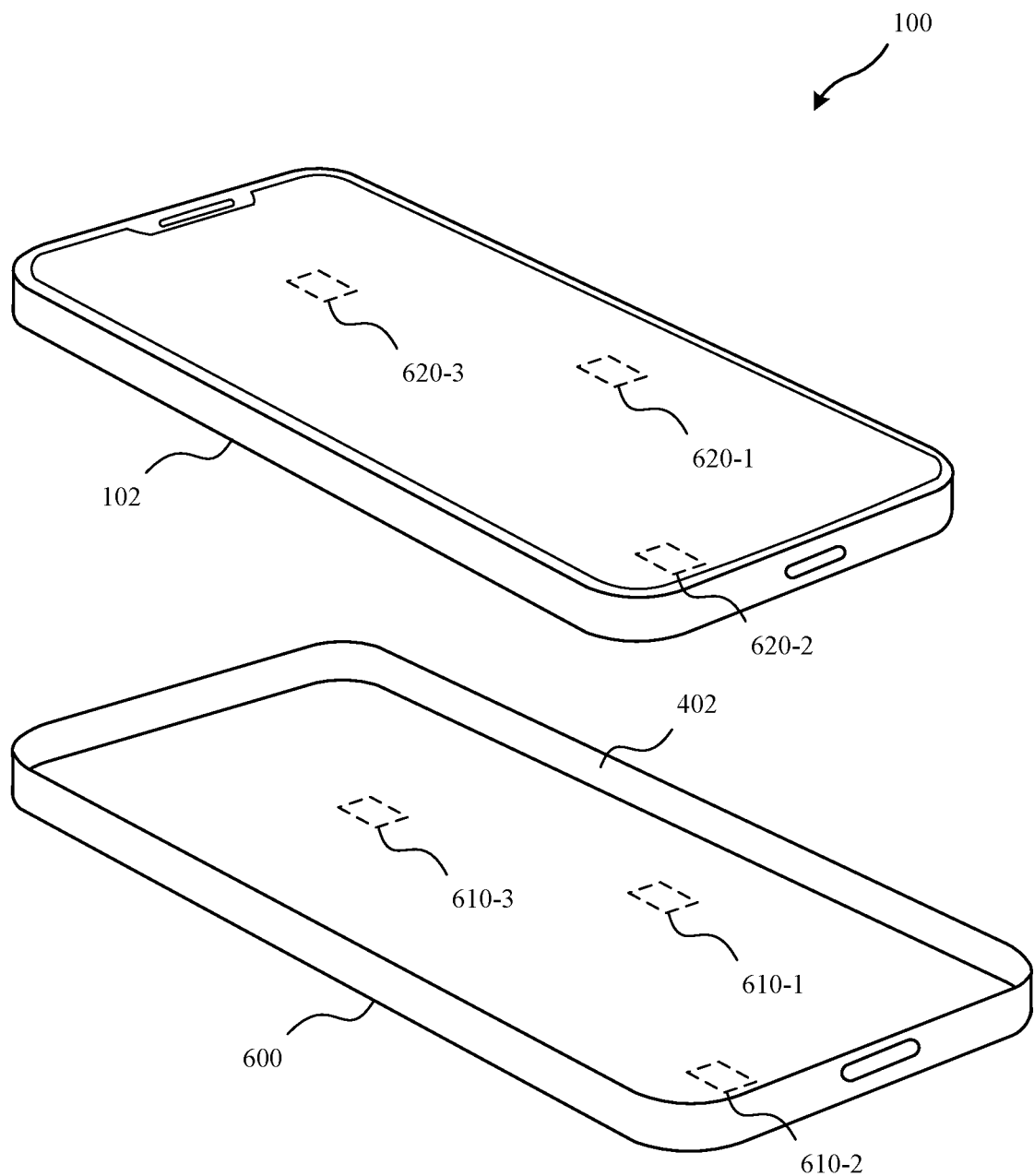
FIG. 6 illustrates a protective case for the portable electronic device, in accordance with some embodiments.

FIG. 6 illustrates a protective case 600 for the portable electronic device 100, in accordance with some embodiments. Although using a single magnetic element embedded within the protective case 400 can be effective for signaling to the portable electronic device 100 that the portable electronic device 100 is retained within the protective case 400, such embodiments can be susceptible to false detection events due to stray magnetic fields. In some embodiments, a protective case 600 can include multiple elements 610 corresponding with multiple, discrete sensors 620 included in the portable electronic device 100. For example, as depicted in FIG. 6, a first element 610-1, a second element 610-2, and a third element 610-3 can be utilized to encode a protective case identifier within a resulting magnetic field. By sampling the magnitude and/or orientation of the magnetic field at different locations corresponding to a first sensor 620-1, a second sensor 620-2, and a third sensor 620-3, the portable electronic device 100 can identify the presence of the protective case 600. Using multiple sensors 620 as discrete inputs for determining that the portable electronic device 100 is retained within the protective case 600 also reduces the probability that the portable electronic device 100 falsely detects the protective case 600 due to stray magnetic fields. For example, alternating the orientation of the magnetic field component generated by each element 610 can prevent false indications that the portable electronic device 100 is encased within a protective case 600 as any external magnetic field generated by a separate magnetic source is unlikely to have a similar magnitude and/or orientation at separate points relative to the portable electronic device 100.

Figure 7:
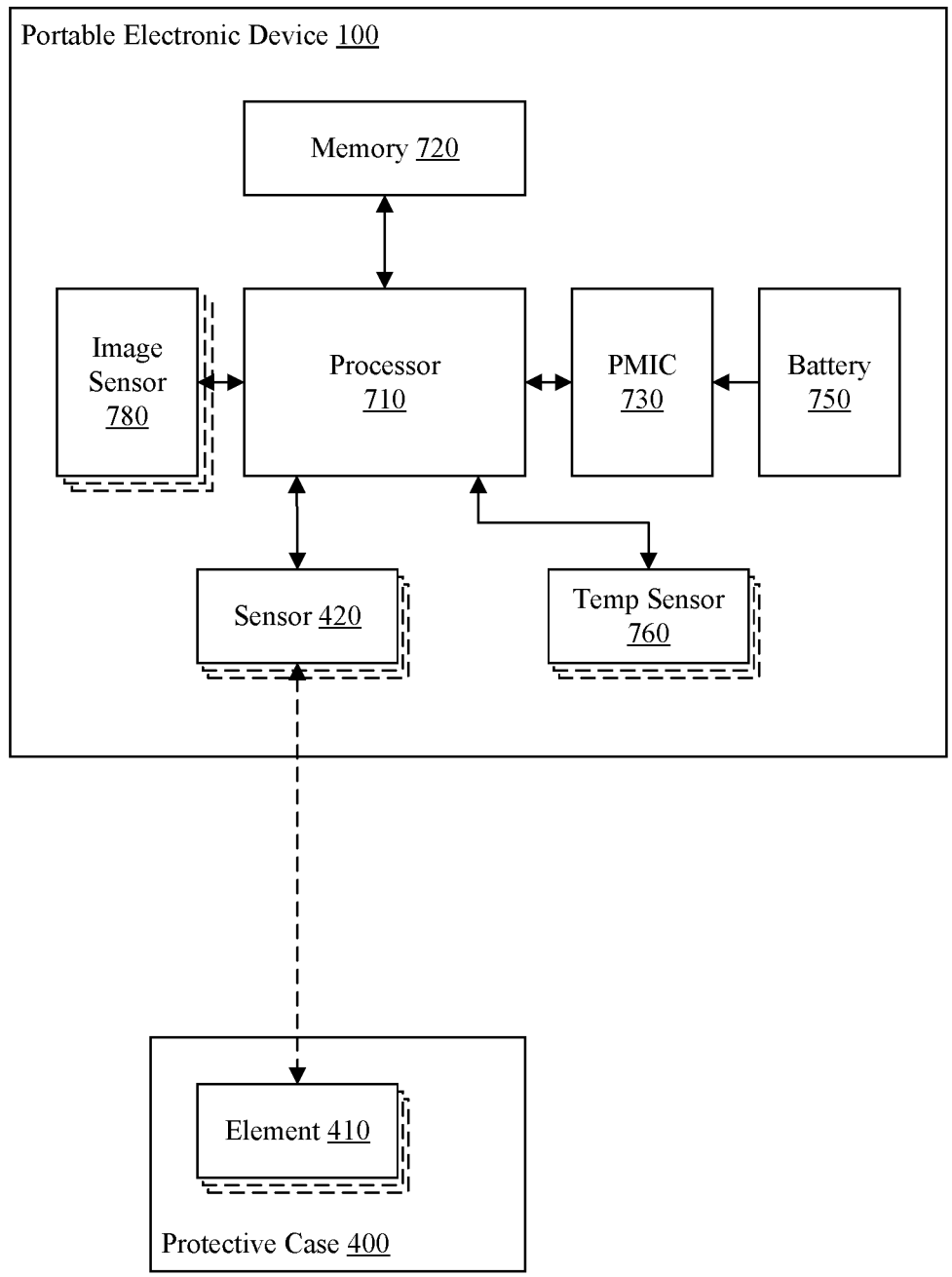
FIG. 7 illustrates a schematic diagram of a number of components of the portable electronic device, in accordance with some embodiments.

FIG. 7 illustrates a schematic diagram of a number of components of the portable electronic device 100, in accordance with some embodiments. As depicted in FIG. 7, the portable electronic device 100 includes a processor 710 coupled to a memory 720. In some embodiments, the processor 710 is a central processing unit implemented within an integrated circuit. In other embodiments, the processor 710 is a system-on-chip (SoC) that includes at least one central processing unit core and at least one graphics processing unit core implemented within an integrated circuit. The SoC includes multiple GPU cores coupled to one or more CPU cores that are in communication via a bus or other type of interconnect network (e.g., a switchable matrix, crossbar, etc.).

The memory 720 can store instructions and data that are consumed by the processor 710. In some embodiments, the memory 720 is a dynamic random access memory (DRAM) that is implemented on a separate integrated circuit included in the same package as the processor 710 in a package-on-package (POP) technology. In other embodiments, the processor 710 and the memory 720 can be discrete components included in different packages soldered to a main printed circuit board (PCB). The instructions stored in the memory 720 can include firmware of the portable electronic device 100, an operating system, one or more applications, software libraries, and the like. The processor 710 can be configured to execute the instructions to perform various operations.

In some embodiments, the instructions can be configured to control various components of the portable electronic device 100. The portable electronic device 100 can be configured to operate in a first operating state that can be referred to as a normal mode of operation. In the first operating state, a component of the portable electronic device 100 is operable at a first operating temperature that corresponds to a first temperature range at a surface of the housing 102. For example, during normal operation, the processor 710 can generate heat that raises the temperature of the processor 710 to a particular operating temperature. The heat is dissipated within the cavity 202 of the portable electronic device 100, which raises the temperature on an external surface of the housing 102 to a particular temperature within a safe range (e.g., −30° F. to 110° F.).

The processor 710 can measure the temperature of a component (e.g., the SoC, a printed circuit board, the housing, etc.) directly via one or more temperature sensors 760 included within the portable electronic device. In some embodiments, a temperature sensor 760 can be embedded directly within an integrated circuit to measure the temperature of the integrated circuit. The temperature sensor 760 can generate a signal that is read by the processor 710 and correlated to a temperature of the component (e.g., the integrated circuit). In some embodiments, a temperature sensor 760 can be included on a printed circuit board of the portable electronic device 100 as a discrete component external to the integrated circuit of the processor 710. For example, a temperature sensor can measure the temperature of the gas within the cavity 202 proximate the processor 710 or any other heat generating component within the cavity 202. In some embodiments, the temperature sensor 760 can be placed proximate a side wall of the housing 102 near the processor 710 and/or an image sensor 780. Of course, the temperature sensor 760 can be placed in any location within the cavity 202 or embedded within any other discrete component of the portable electronic device 100. In other embodiments, the temperature sensor 760 can comprise a thermistor, which has a resistance that decreases with an increasing temperature of the thermistor. The thermistor can be placed proximate a location on the housing 102 to estimate a temperature of the housing 102 on an external surface of the housing 102.

It will be appreciated that the temperature sensor 760 is configured to measure a temperature that is different from the temperature at a particular location on the external surface of the housing 102. Consequently, the processor 710 can be configured to correlate the measured temperature with an estimated temperature on the external surface of the housing 102. For example, a temperature of an integrated circuit as measured by the temperature sensor 760 can be higher than the temperature on the external surface of the housing 102 as the heat flows within the portable electronic device 100. A model can be developed to correlate a temperature measured by one temperature sensor 760 to an estimated temperature at a specific location on the external surface of the housing 102. In some embodiments, the measured temperature from multiple temperature sensors 760 can be provided as input to the model to generate the estimated temperature at the specific location on the external surface of the housing 102. Using multiple temperate inputs can provide a more accurate estimate of the actual temperature on the external surface of the housing.

In some embodiments, the operation of the portable electronic device can be adjusted based on a comparison of the estimated temperature at the specific location on the external surface of the housing 102 with a threshold value. In some embodiments, the threshold value can represent a safe temperature for operating one or more components of the portable electronic device 100. In some embodiments, the threshold value represents a maximum temperature at which the portable electronic device 100 can be safely handled, within a temperature range, without making a user uncomfortable or burning a user's hand. For example, the threshold value can be set at 110 degrees Fahrenheit, which is a level that can be held by a user for an extended period of time without feeling uncomfortable.

When the estimated temperature at a specific location on the external surface of the housing 102 exceeds the threshold value, then the portable electronic device 100 can be configured to operate in a low power mode of operation. In the low power mode of operation, various operating characteristics of the portable electronic device 100 can be adjusted. In some embodiments, operations can be changed to reduce the heat generated by a particular component. For example, video capturing operations can be adjusted to capture video at 1080p resolution at 30 frames per second rather than 4 k resolution at 60 frames per second to reduce the heat generated by an image sensor 780 of the portable electronic device 100. Alternatively, the image sensor 780 can be disabled in the low power mode of operation. As another example, the processor 710 can adjust a supply voltage or an operating frequency of the main system clock to reduce the heat generated by the processor 710.

In some embodiments, the processor 710 can send a signal to a power management integrated circuit (PMIC) 730, external to the processor 710, that causes the PMIC 730 to adjust a supply voltage or an external clock provided to the processor 710. The PMIC 730 can be coupled to a battery 750 that is a power source for the various components of the portable electronic device 100. The PMIC 730 can also include an oscillator that generates the main system clock provided to the processor 710. In other embodiments, the PMIC 730 can be omitted and the processor 710 can include on-chip voltage regulators and/or voltage controlled oscillators (VCOs) to adjust the voltage or clock frequency of the processor 710.

It will be appreciated that the processor 710 is configured to cause the portable electronic device 100 to enter the low power mode of operation based on a comparison of the estimated temperature at a specific location on the external surface of the housing 102 with the threshold value. Where the threshold value is based on the comfort of a user touching the housing 102, the use of an accessory, such as protective case 400, 500, or 600, that covers the external surface of the housing 102 allows the threshold value to be increased because the accessory prevents the user from touching the external surface of the housing 102 directly. In other words, the protective case enables safe handling of the portable electronic device 100 at higher operating temperatures than would otherwise be suitable without said protective case.

In some embodiments, the processor 710 is in communication with a sensor 420, which generates a signal that indicates the portable electronic device 100 is in contact with and retained by a protective case, such as protective case 400. Responsive to receiving the signal, the processor 710 allows a component to operate in a second operating state at a second operating temperature, greater than the first operating temperature, which corresponds to a second temperature range at the surface of the housing. In some embodiments, a maximum temperature within the first temperature range can be increased by a few degrees to define the second temperature range. For example, if the first temperature range is, e.g., −30° F. to 110° F., then the second temperature range can be, e.g., −30° F. to 115° F. The portable electronic device 100 can be configured to operate in a second operating state that is similar to the normal mode of operation except that a parameter, such as the temperature threshold value, is adjusted compared to the first operating state.

In some embodiments, the second operating state represents an enhanced operating state. In addition to increasing the temperature threshold value or other parameters of the portable electronic device 100, various components can be operated in a manner that cause additional heat to be generated compared with the normal mode of operation. For example, a frequency of a system clock of the processor 710 can be increased, which can be commonly referred to as overclocking, because the amount of heat that can be safely generated by the processor is increased with use of the protective case.

It will be appreciated that, as used herein, the adjusting of parameters is commonly implemented in software by, e.g., changing values of parameters in a firmware, an operating system, or other applications executed by the processor 710. Of course, in other embodiments, adjusting a parameter or changing a mode of operation can also refer to a circuit that enables or disables various components or functions of the device. For example, a power gating circuit can be utilized to power gate one or more components that effectively disables/enables those components based on the signal from one or more sensors.

Figure 8:
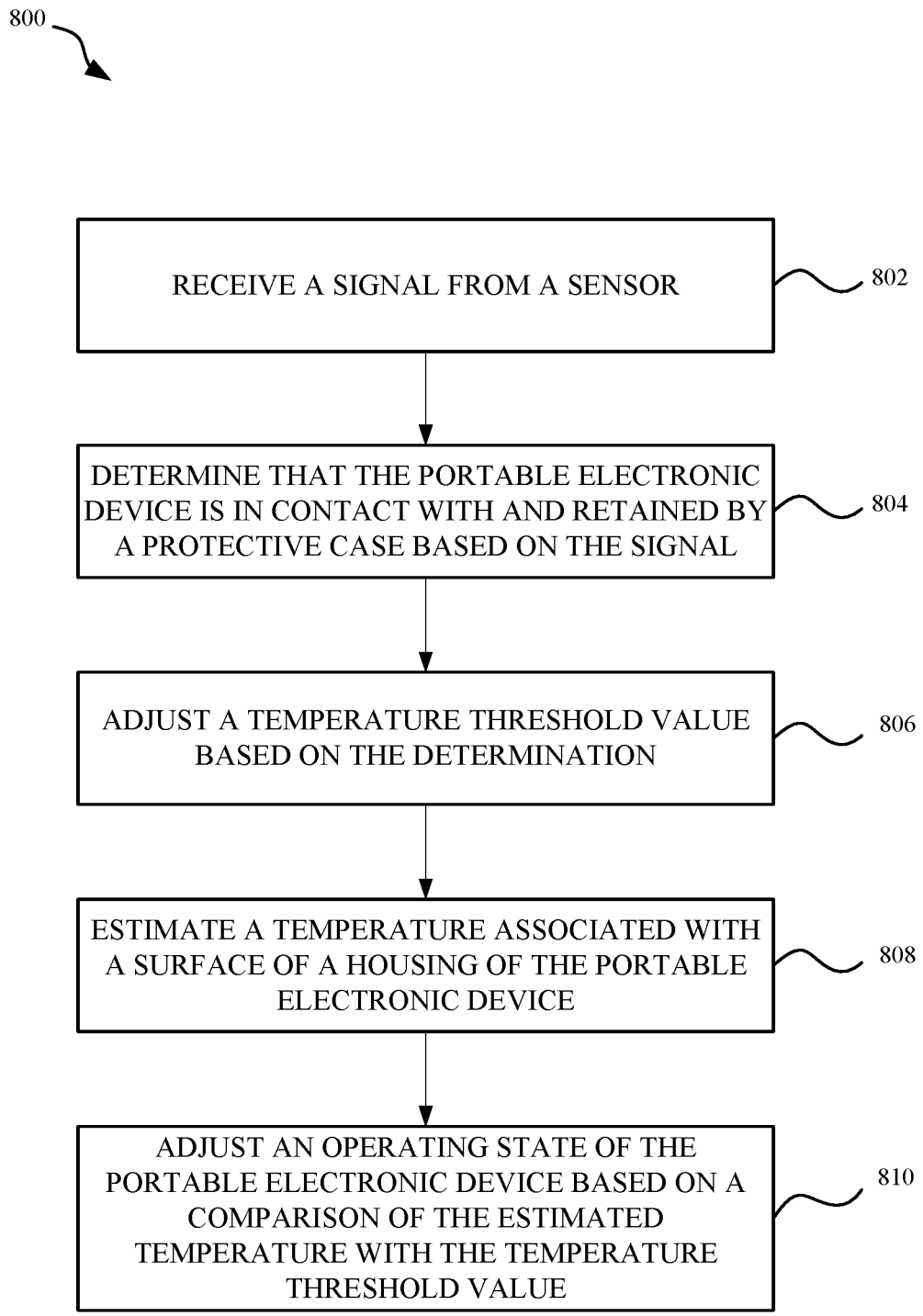
FIG. 8 is a flow diagram of a method for adjusting the operation of a portable electronic device, in accordance with some embodiments.

FIG. 8 is a flow diagram of a method 800 for adjusting the operation of a portable electronic device 100, in accordance with some embodiments. The method 800 can be performed by hardware, software, or some combination of hardware and software. In some embodiments, the method 800 is performed by a processor executing instructions included in firmware or an operating system stored in a memory coupled to the processor.

At 802, a signal is received at the processor from a sensor included in the portable electronic device. In some embodiments, the sensor is a magnetic sensor such as a Hall Effect sensor or a magnetometer. In other embodiments, the sensor is an antenna and/or signal processing circuitry configured to receive radio frequency signals via a wireless communications protocol.

At 804, the processor determines that the portable electronic device is in contact with and retained by a protective case based on the signal. In some embodiments, a magnetic element embedded within the protective case triggers a magnetic sensor to indicate that the protective case is attached to the portable electronic device. In other embodiments, an RFID tag is excited by a radio frequency signal when in proximity to the portable electronic device, which indicates a type of the protective case near the portable electronic device. A range to the RFID tag can be estimated based on a time to receive a response signal from the RFID tag responsive to the excitation signal. Alternatively, a range to the RFID tag can be estimated by limited the strength of the excitation signal such that the response signal will only be generated by the RFID tag if the RFID tag is within a threshold distance of the portable electronic device. The range can be used to determine whether the protective case is attached to the portable electronic device. In other embodiments, touch sensors, mechanical limit switches, optical sensors, or the like can be utilized to make the determination such as by detecting whether a particular surface is covered by the protective case based on the light that reaches an optical sensor in the particular surface.

At 806, the processor adjusts a temperature threshold value based on the determination that the portable electronic device is in contact with and retained by a protective case. The temperature threshold can represent a comfort level associated with a user touching a surface of the portable electronic device. The temperature threshold value can be increased by a few degrees, which is associated with an extended operating state that is similar to the normal operating state with an expanded temperature range for the operating temperature of a component of the portable electronic device.

At 808, the processor estimates a temperature associated with a surface of a housing of the portable electronic device.

In some embodiments, the processor reads a signal generated by a temperature sensor disposed within the cavity of the housing of the portable electronic device. The signal indicates a measured temperature at the temperature sensor, which is then correlated to an estimated temperature at the surface of the housing of the portable electronic device.

At 810, the processor adjusts an operating state of the portable electronic device based on a comparison of the estimated temperature with the temperature threshold value. In some embodiments, the processor causes the portable electronic device to operate in a low power operation mode in response to determining that the estimated temperature exceeds the temperature threshold value. The low power operation mode can help reduce an operating temperature of a component of the portable electronic device. When the estimated temperature is reduced below the temperature threshold value, then the processor can cause the portable electronic device to return to a normal mode of operation.

Figure 9:
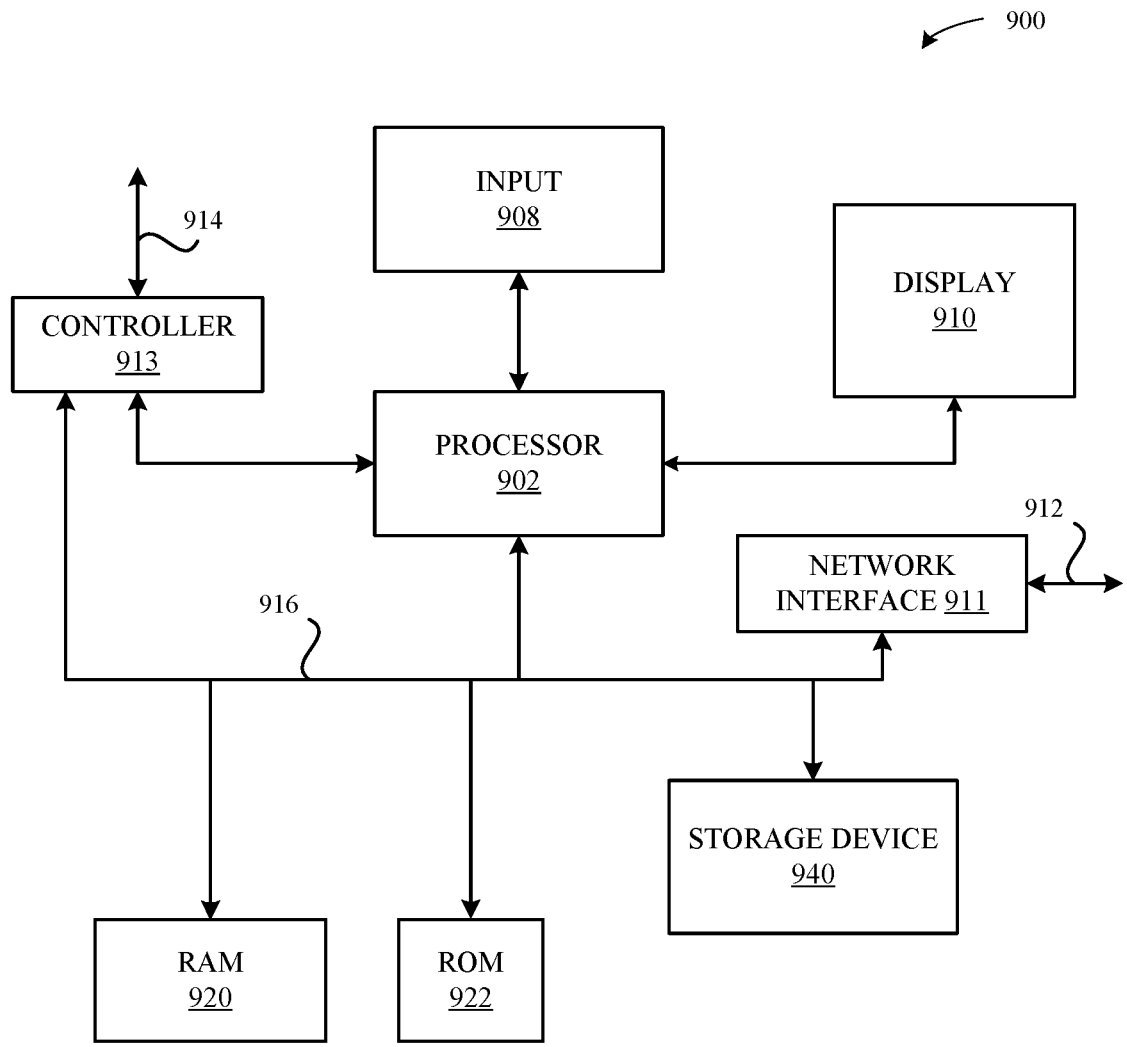
FIG. 9 illustrates a detailed view of an exemplary computing device 900 that can be used to implement the various apparatus and/or methods described herein, in accordance with some embodiments.

FIG. 9 illustrates a detailed view of an exemplary computing device 900 that can be used to implement the various apparatus and/or methods described herein, in accordance with some embodiments. In particular, the detailed view illustrates various components that can be included in the computing devices illustrated in FIGS. 1 to 8 and/or described herein. For example, the portable electronic devices 100, or any other device including any network devices and/or consumer electronics, can include the components of computing device 900. For example, one or more of the components shown in FIG. 9 can be included in the cavity 202 of the portable electronic device 100.

As shown in FIG. 9, the computing device 900 can include a processor 902 that represents a microprocessor or controller for controlling the overall operation of computing device 900. The computing device 900 can also include a user input device 908 that allows a user of the computing device 900 to interact with the computing device 900. For example, the user input device 908 can take a variety of forms, such as a button, keypad, dial, touch screen, audio input interface, visual/image capture input interface, input in the form of sensor data, etc. Still further, the computing device 900 can include a display 910 (screen display) that can be controlled by the processor 902 to present visual information to the user. A data bus 916 can facilitate data transfer between at least a storage device 940, the processor 902, and a controller 913. The controller 913 can be used to interface with and control different equipment through an equipment control bus 914. The computing device 900 can also include a network/bus interface 911 that couples to a data link 912. In the case of a wireless connection, the network/bus interface 911 can include a wireless transceiver.

The computing device 900 also include a storage device 940, which can comprise a single disk or a plurality of disks (e.g., hard drives), and includes a storage management module that manages one or more partitions within the storage device 940. In some embodiments, storage device 940 can include flash memory, semiconductor (solid state) memory or the like. The computing device 900 can also include a Random Access Memory (RAM) 920 and a Read-Only Memory (ROM) 922. The ROM 922 can store programs, utilities or processes to be executed in a non-volatile manner. The RAM 920 can provide volatile data storage, and stores instructions related to the operation of the computing device 900.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for adjusting a heat-generating component of a portable electronic device, the heat-generating component operable at i) a first power mode of operation up to a first threshold temperature and ii) a second power mode of operation up to a second threshold temperature, the second threshold temperature greater than the first threshold temperature, the method comprising:
   by the portable electronic device:
      operating the heat-generating component in accordance with the first power mode;
      receiving, at a housing, a case comprising a magnet;
      detecting, by a Hall Effect sensor of the portable electronic device, a magnetic field generated by the magnet;
      determining, based on the Hall Effect sensor, the case is secured with the housing; and
      increasing, by a processor, the threshold temperature from the first threshold temperature to the second threshold temperature, thereby permitting the heat-generating component to operate in accordance with second first power mode.

2. The method of claim 1, wherein detecting the magnetic field by the Hall Effect sensor comprises:
   determining a first magnetic field orientation associated with case, and
   determining a second magnetic field orientation associated with a second case different from the case.

3. The method of claim 1, further comprising a temperature sensor embedded within the heat-generating component, the temperature sensor generating a signal that is utilized by the processor to determine an operating temperature of the heat-generating component.

4. The method of claim 1, further comprising correlating, by the processor, an operating temperature of the heat-generating component to an estimated temperature at the housing.

5. The method of claim 1, wherein the Hall Effect sensor is configured to detect a magnitude or an orientation of the magnetic field generated by a magnetic element embedded in the case.

6. The method of claim 1, further comprising receiving a signal, at the processor, that indicates the portable electronic device is in contact with and retained by a protective case, the signal configured to operate according to a Near Field Communication (NFC) protocol.

7. The method of claim 6, wherein the case includes a passive radio frequency identification (RFID) tag that, when excited by a radio frequency signal generated by the portable electronic device, emits the signal indicating that the protective case is in contact with and retained by the portable electronic device.

8. The method of claim 1, wherein the processor causes the heat-generating component to enter the first power mode of operation when an operating temperature of the heat-generating component exceeds a temperature threshold.

9. A computing device, the device comprising:
a housing including a cavity formed therein, the housing carrying within the cavity:
a heat-generating component comprising an operation in accordance with i) a first temperature threshold and ii) a second temperature threshold greater than the first temperature threshold;
a Hall Effect sensor configured to detect a magnitude and orientation of a magnetic field from a magnet embedded within an accessory device; and
a processor configured to:
determine whether the magnetic field is detected by the Hall Effect sensor;
when the magnetic field is detected by the Hall Effect sensor, increase the operation from the first temperature threshold to the second temperature threshold, and
when the magnetic field is not detected by the Hall Effect sensor, cause the heat-generating component to operate in accordance with the first temperature threshold.

10. The computing device of claim 9, wherein the heat-generating component comprises a processing circuit configured to operate at:
a first processing speed associated with the first temperature threshold, and a second processing speed associated with the second temperature threshold, the second processing speed greater than the first processing speed.

11. The computing device of claim 10, wherein the processor determines, based on detection of the magnetic field by the Hall Effect sensor, the housing is covered by the accessory device.

12. The computing device of claim 9, further comprising a temperature sensor configured to measure an operating temperature of the heat-generating component, wherein:
when the magnetic field is detected by the Hall Effect sensor, the processor compares the operating temperature with the second temperature threshold,
when the operating temperature is at least at the second temperature threshold, the processor causes the heat-generating component to operate at a first power mode, and
when the operating temperature is below the second threshold temperature, the processor causes the heat-generating component to operate at a second power mode that is greater than the first power mode.

13. The computing device of claim 12, wherein:
when the magnetic field is not detected by the Hall Effect sensor, the processor compares the operating temperature with the first temperature threshold,
when the operating temperature is at least at the first temperature threshold, the processor causes the heat-generating component to operate at the first power mode, and
when the operating temperature is below the first temperature threshold, the processor causes the heat-generating component to operate at the second power.

14. The computing device of claim 9, wherein the Hall Effect sensor is configured to determine:
a first magnetic field orientation associated with the accessory device, and
a second magnetic field orientation associated with a second accessory device different from the accessory device.

15. The computing device of claim 9, further comprising:
a second Hall Effect sensor; and
a third Hall Effect sensor, wherein the Hall Effect sensor defines a first Hall Effect sensor, and the processor increases from the first temperature threshold to the second temperature threshold in response to i) the first Hall Effect sensor detecting the magnet, ii) a second Hall Effect sensor detecting a second magnet, and iii) a third Hall Effect sensor detecting a third magnet.

* * * * *

UNITED STATES PATENT AND TRADEMARK OFFICE
CERTIFICATE OF CORRECTION

PATENT NO. : 10,838,462 B1
APPLICATION NO. : 16/289610
DATED : November 17, 2020
INVENTOR(S) : Monaco et al.

Page 1 of 1

It is certified that error appears in the above-identified patent and that said Letters Patent is hereby corrected as shown below:

In the Claims

In Claim 1, at Column 18, Line 48: "second first power mode." should read -- second power mode. --.

Signed and Sealed this
Twenty-sixth Day of January, 2021

Drew Hirshfeld
*Performing the Functions and Duties of the*
*Under Secretary of Commerce for Intellectual Property and*
*Director of the United States Patent and Trademark Office*